United States Patent
Shami (10) Patent No.: US 10,317,907 B2
(45) Date of Patent: Jun. 11, 2019

(54) SYSTEMS AND METHODS FOR OBSTACLE AVOIDANCE AND PATH PLANNING IN AUTONOMOUS VEHICLES

(71) Applicant: GM GLOBAL TECHNOLOGY OPERATIONS LLC, Detroit, MI (US)

(72) Inventor: Constandi J. Shami, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 103 days.

(21) Appl. No.: 15/581,467

(22) Filed: Apr. 28, 2017

(65) Prior Publication Data
US 2018/0314259 A1    Nov. 1, 2018

(51) Int. Cl.
    *G05D 1/02*       (2006.01)
    *G08G 1/16*       (2006.01)
    *G08G 1/01*       (2006.01)

(52) U.S. Cl.
    CPC ......... *G05D 1/0214* (2013.01); *G05D 1/0238* (2013.01); *G05D 1/0276* (2013.01); *G05D 1/0287* (2013.01); *G08G 1/0112* (2013.01); *G08G 1/0129* (2013.01); *G08G 1/0145* (2013.01); *G05D 2201/0213* (2013.01); *G08G 1/165* (2013.01)

(58) Field of Classification Search
CPC .. G08G 1/0112; G08G 1/0129; G08G 1/0145; G08G 1/165; G05D 1/0238; G05D 1/0276; G05D 1/0214; G05D 2201/0213
See application file for complete search history.

(56) References Cited

U.S. PATENT DOCUMENTS

| | | | |
|---|---|---|---|
| 9,711,050 B2* | 7/2017 | Ansari | G08G 1/167 |
| 2007/0193798 A1* | 8/2007 | Allard | B60T 7/22 180/169 |
| 2008/0262669 A1* | 10/2008 | Smid | G05D 1/0278 701/23 |
| 2010/0063663 A1* | 3/2010 | Tolstedt | G05D 1/0231 701/23 |
| 2010/0063680 A1* | 3/2010 | Tolstedt | G05D 1/0214 701/41 |
| 2012/0316725 A1* | 12/2012 | Trepagnier | G01S 17/023 701/26 |
| 2013/0325306 A1* | 12/2013 | Caveney | B60W 30/0953 701/117 |
| 2015/0025708 A1* | 1/2015 | Anderson | A61B 5/6804 701/2 |
| 2016/0375901 A1* | 12/2016 | Di Cairano | B60W 30/09 701/26 |
| 2017/0123421 A1* | 5/2017 | Kentley | G01C 21/26 |
| 2017/0329337 A1* | 11/2017 | Kusano | G08G 1/0965 |
| 2018/0136000 A1* | 5/2018 | Rasmusson, Jr. | G01C 21/3638 |

(Continued)

*Primary Examiner* — Mussa A Shaawat
(74) *Attorney, Agent, or Firm* — Lorenz & Kopf LLP (57) ABSTRACT

Systems and method are provided for controlling a vehicle. A path planning method for a vehicle includes establishing a first path for a first vehicle, then receiving, at the first vehicle, sensor data associated with a behavior of one or more leading vehicles observed in the vicinity of the first vehicle. The method further includes establishing a modified path that diverges from the first path based on the sensor data, then classifying, with a processor, an obstacle observed by the first vehicle as it travels along the modified path.

20 Claims, 6 Drawing Sheets

(56) References Cited

U.S. PATENT DOCUMENTS

2018/0233047 A1* 8/2018 Mandeville-Clarke ...................... G08G 1/166
2018/0292222 A1* 10/2018 Lin .................... G01C 21/3446

* cited by examiner

SYSTEMS AND METHODS FOR OBSTACLE AVOIDANCE AND PATH PLANNING IN AUTONOMOUS VEHICLES

TECHNICAL FIELD

The present disclosure generally relates to vehicles, such as autonomous vehicles, and more particularly relates to systems and methods for path planning in the presence of roadway obstacles.

BACKGROUND

An autonomous vehicle is a vehicle that is capable of sensing its environment and navigating with little or no user input. It does so by using sensing devices such as radar, lidar, image sensors, and the like. Autonomous vehicles further use information from global positioning systems (GPS) technology, navigation systems, vehicle-to-vehicle communication, vehicle-to-infrastructure technology, and/or drive-by-wire systems to navigate the vehicle.

While recent years have seen significant advancements in autonomous vehicles, such vehicles might still be improved in a number of respects. For example, it is not uncommon for a vehicle to encounter some form of unexpected obstacle along its planned path. That is, certain types of embedded obstacles such as speed bumps, potholes, and the like, as well as transient obstacles such as stopped cars, tire debris, small animals, etc. might not be adequately accounted for during path planning, particularly in autonomous vehicles.

Accordingly, it is desirable to provide systems and methods for implementing object avoidance and path planning in autonomous vehicles. Furthermore, other desirable features and characteristics of the present invention will become apparent from the subsequent detailed description and the appended claims, taken in conjunction with the accompanying drawings and the foregoing technical field and background.

SUMMARY

Systems and method are provided for controlling an autonomous vehicle. In one embodiment, a path planning method for a vehicle includes establishing a first path for a first vehicle, then receiving, at the first vehicle, sensor data associated with a behavior of one or more leading vehicles observed in the vicinity of the first vehicle. The method further includes establishing a modified path that diverges from the first path based on the sensor data, then classifying, with a processor, an obstacle observed by the first vehicle as it travels along the modified path.

In one embodiment, an autonomous vehicle includes one or more sensors configured to produce sensor data associated one or more leading vehicles located in the vicinity of the autonomous vehicle, and a leading vehicle observation module configured to receive the sensor data and establish a modified path that diverges from an initially established path based on the behavior of the leading vehicles. The autonomous vehicle further includes an obstacle classification module, including a processor, configured to classify an obstacle observed by the autonomous vehicle as it travels along the modified path.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
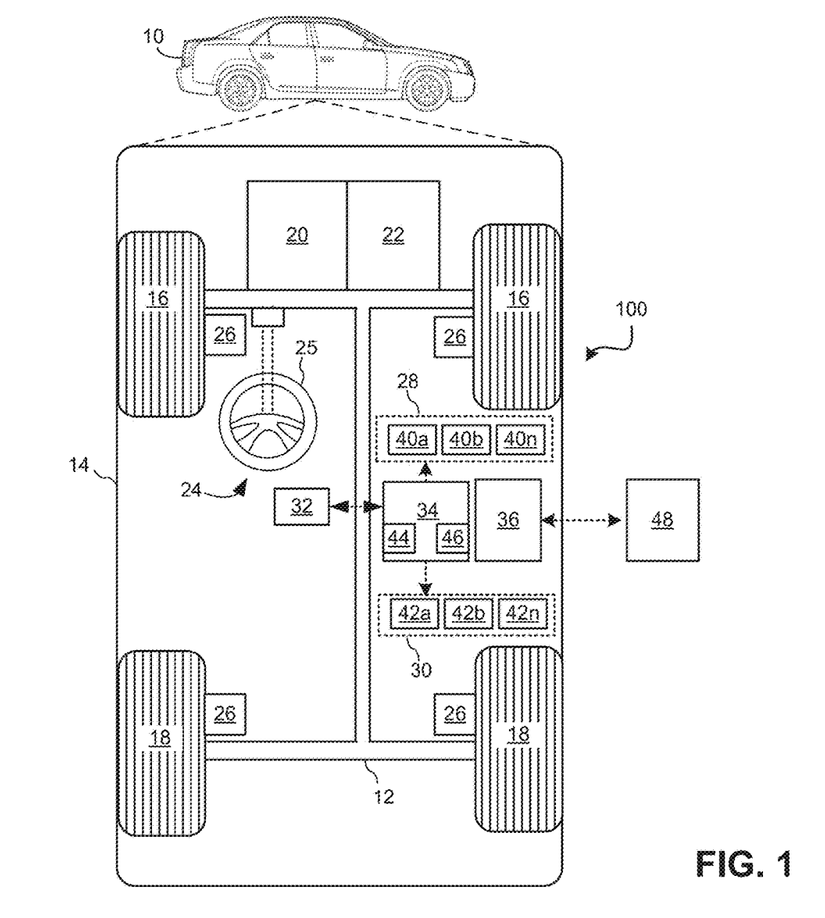
FIG. 1 is a functional block diagram illustrating an autonomous vehicle including a system in accordance with various embodiments.

With reference to FIG. 1, an obstacle avoidance/path planning system (or simply "obstacle avoidance system")

shown generally as 100 is associated with a vehicle 10 in accordance with various embodiments. In general, obstacle avoidance system 100 is capable of observing the behavior of one or more vehicles in the vicinity of vehicle 10 (e.g., leading vehicles in the same lane that appear to be swerving around an as-yet unseen obstacle) and modifying its established path based on that behavior and the nature of the obstacle. Local and cloud-based map data may then be updated to document the presence of the obstacle.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, the vehicle 10 is an autonomous vehicle and the driving mode selection system 100 is incorporated into the autonomous vehicle 10 (hereinafter referred to as the autonomous vehicle 10). The autonomous vehicle 10 is, for example, a vehicle that is automatically controlled to carry passengers from one location to another. The vehicle 10 is depicted in the illustrated embodiment as a passenger car, but it should be appreciated that any other vehicle, including motorcycles, trucks, sport utility vehicles (SUVs), recreational vehicles (RVs), marine vessels, aircraft, etc., can also be used.

In an exemplary embodiment, the autonomous vehicle 10 corresponds to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. While vehicle 10 is generally referred to herein as an "autonomous vehicle," this term is used without loss of generality, since the present subject matter may be applied to any vehicle or moving platform that employs path planning and which might need to modify an established path based on obstacles in its path.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the autonomous vehicle 10. The sensing devices 40a-40n might include, but are not limited to, radars, lidars, global positioning systems, optical cameras, thermal cameras, ultrasonic sensors, and/or other sensors. In some embodiments, sensing devices 40a-40n include one or more sensors capable of observing occupants of the vehicle and classifying their respective states (e.g., using a trained neural network or other such classification model known in the art).

The actuator system 30 includes one or more actuator devices 42a-42n that control one or more vehicle features such as, but not limited to, the propulsion system 20, the transmission system 22, the steering system 24, and the brake system 26. In various embodiments, autonomous vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. Route information may also be stored within data storage device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and non-volatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals that are transmitted to the actuator system 30 to automatically control the components of the autonomous vehicle 10 based on the logic, calculations, methods, and/or algorithms. Although only one controller 34 is shown in FIG. 1, embodiments of the autonomous vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10. In one embodiment, as discussed in detail below, controller 34 is configured to allow an occupant to select a driving mode based on occupant preferences, vehicle state, and occupant state.

Figure 2:
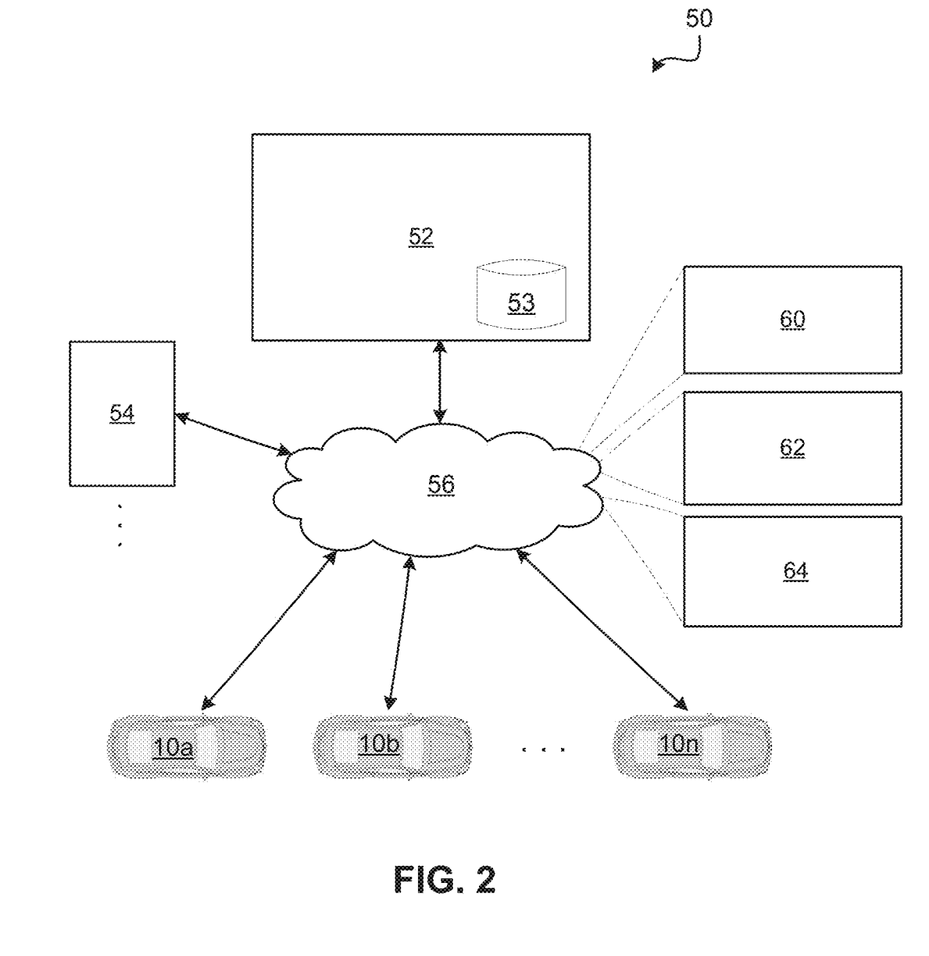
FIG. 2 is a functional block diagram illustrating a transportation system having one or more autonomous vehicles as shown in FIG. 1, in accordance with various embodiments.

The communication system 36 is configured to wirelessly communicate information to and from other entities 48, such as but not limited to, other vehicles ("V2V" communication), infrastructure ("V2I" communication), remote transportation systems, and/or user devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, a amusement park, or an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system (or simply "remote transportation system") 52 that is associated with one or more autonomous vehicles 10a-10n as described with regard to FIG. 1. In various embodiments, the operating environment 50 (all or a part of which may correspond to entities 48 shown in FIG. 1) further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 may include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a-10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a component of a home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, not shown), which may be cloud-based, network-based, or resident at the particular campus or geographical location serviced by the remote transportation system 52. The remote transportation system 52 can be manned by a live advisor, an automated advisor, an artificial intelligence system, or a combination thereof. The remote transportation system 52 can communicate with the user devices 54 and the autonomous vehicles 10a-10n to schedule rides, dispatch autonomous vehicles 10a-10n, and the like. In various embodiments, the remote transportation system 52 stores store account information such as subscriber authentication information, vehicle identifiers, profile records, biometric data, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
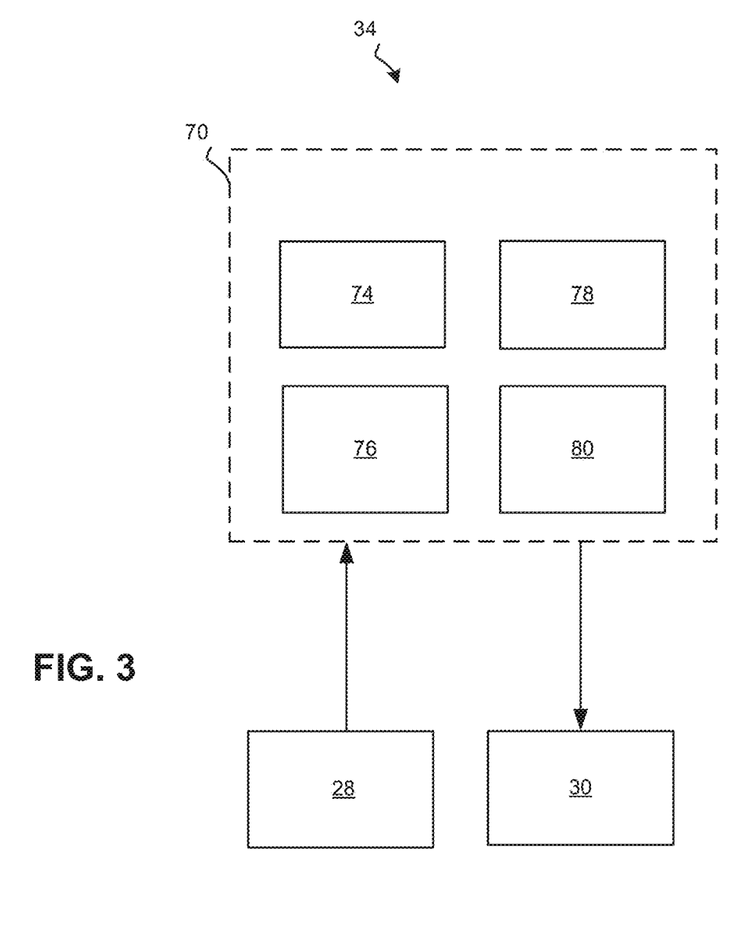
FIG. 3 is functional block diagram illustrating an autonomous driving system (ADS) associated with an autonomous vehicle, in accordance with various embodiments.

In accordance with various embodiments, controller 34 implements an autonomous driving system (ADS) 70 as shown in FIG. 3. That is, suitable software and/or hardware components of controller 34 (e.g., processor 44 and computer-readable storage device 46) are utilized to provide an autonomous driving system 70 that is used in conjunction with vehicle 10.

In various embodiments, the instructions of the autonomous driving system 70 may be organized by function or system. For example, as shown in FIG. 3, the autonomous driving system 70 can include a sensor fusion system 74, a positioning system 76, a guidance system 78, and a vehicle control system 80. As can be appreciated, in various embodiments, the instructions may be organized into any number of systems (e.g., combined, further partitioned, etc.) as the disclosure is not limited to the present examples.

In various embodiments, the sensor fusion system 74 synthesizes and processes sensor data and predicts the presence, location, classification, and/or path of objects and features of the environment of the vehicle 10. In various embodiments, the sensor fusion system 74 can incorporate information from multiple sensors, including but not limited to cameras, lidars, radars, and/or any number of other types of sensors.

The positioning system 76 processes sensor data along with other data to determine a position (e.g., a local position relative to a map, an exact position relative to lane of a road, vehicle heading, velocity, etc.) of the vehicle 10 relative to the environment. The guidance system 78 processes sensor data along with other data to determine a path for the vehicle 10 to follow. The vehicle control system 80 generates control signals for controlling the vehicle 10 according to the determined path.

In various embodiments, the controller 34 implements machine learning techniques to assist the functionality of the controller 34, such as feature detection/classification, obstruction mitigation, route traversal, mapping, sensor integration, ground-truth determination, and the like.

As mentioned briefly above, the obstacle avoidance system 100 of FIG. 1 is configured to observe the behavior of one or more leading vehicle (i.e., vehicles ahead of vehicle 10 in the same lane), establish a modified path based on that observation, then classify the obstacle for further processing and path planning.

Figure 4:
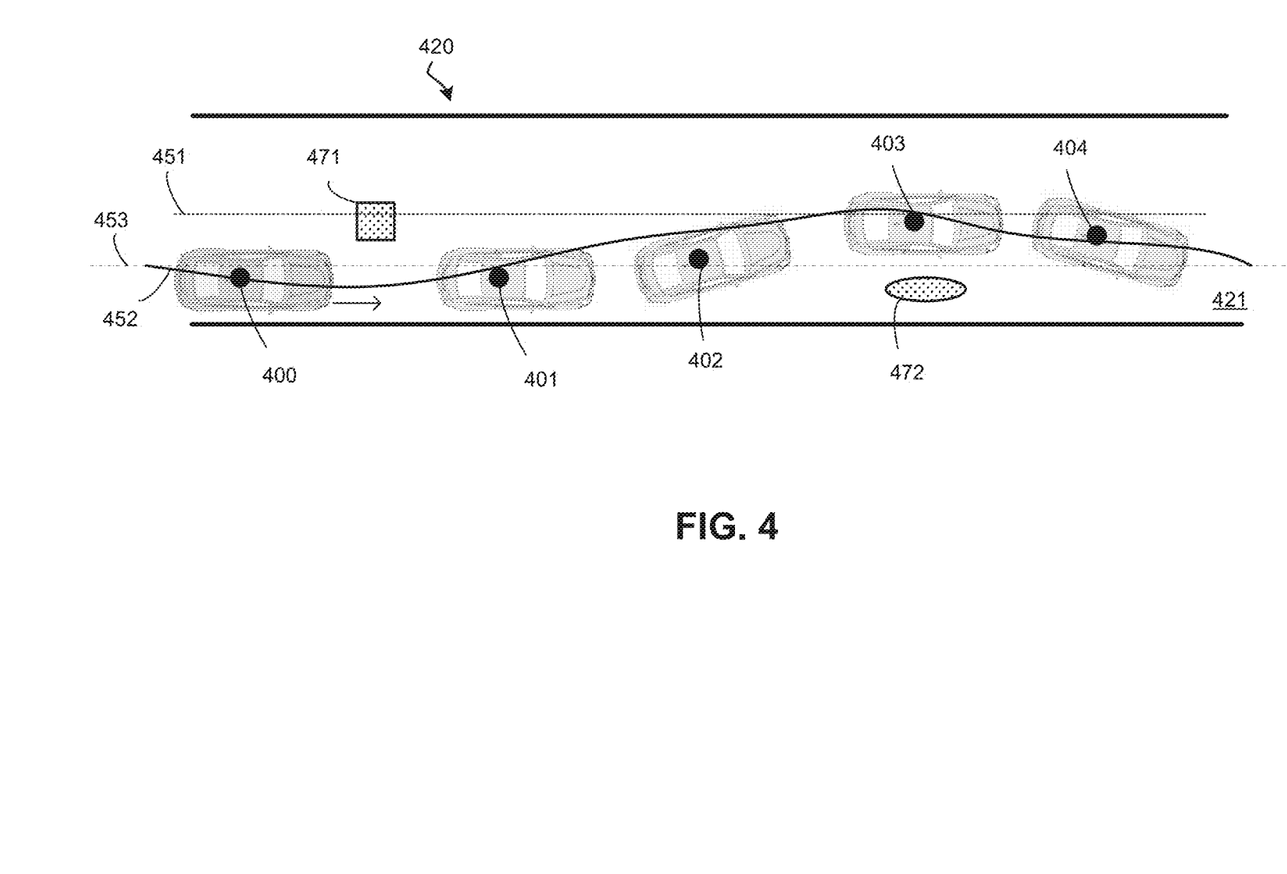
FIG. 4 is a conceptual top-view illustration of an example roadway with associated vehicles useful in describing various embodiments.

In order to illustrate operation of systems and methods in accordance with various embodiments, FIG. 4 illustrates an example roadway 420 having a center line 451 and two obstacles that potentially affect path planning for roadway 420—i.e., obstacles 471 and 472. Traveling along lane 421 of roadway 420 is a vehicle 400 (e.g., autonomous vehicle 10) as well as four additional vehicles 401, 402, 403, and 404, which may or may not be autonomous vehicles. As used herein, vehicle 400 may be referred to as the "first vehicle," while vehicles 401-404 may be referred to as "leading vehicles" as they are positioned in front of vehicle 400 are generally moving in the same general direction in the same lane 421.

As can be seen, the path 452 nominally taken by vehicles 401-404 diverges from the established, first path 453 due to obstacles 471 and 472. That is, vehicles 401-404 are seen to slightly steer to the right (relative to vehicle 400) to avoid obstacle 471 (which lies substantially on center line 451), and more drastically steer to the left to avoid obstacle 472. It will be apparent that the ideal path 453, absent obstacles 471 and 472, would typically be a path down the center of the lane as illustrated. However, to avoid obstacles 471 and 472, the vehicles 401-404 have diverged from the ideal path and instead have traveled along what will be described as a "modified" path 452. Systems and methods in accordance with the present subject matter address the way vehicle 10 might address this divergence in paths.

Figure 5:
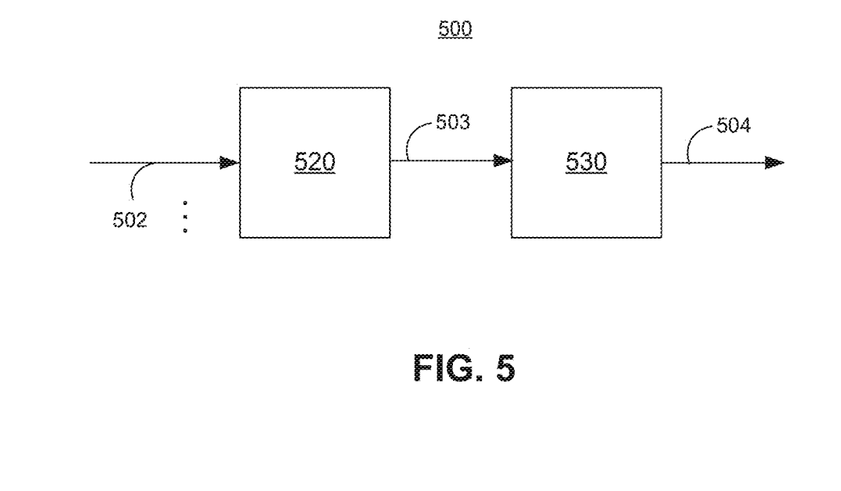
FIG. 5 is a dataflow diagram illustrating a system for an autonomous vehicle, in accordance with various embodiments.

Referring now to FIG. 5 in conjunction with FIGS. 1-4, an exemplary obstacle avoidance system 500 generally includes a leading vehicle observation module 520 configured to receive sensor input 502 (e.g., received sensor system 28 of FIG. 1) associated with vehicles in the vicinity of vehicle 10—i.e., vehicles ahead of vehicle 10 and traveling in substantially the same lane, as shown in FIG. 4. Sensor input 502 might include, for example, lidar and/or optical data relating to the position and paths of vehicles 401-404. Given input 502, module 520 is configured to establish a modified path 503 based on the observed vehicle behavior (i.e., a path that attempts to follow the leading vehicles 401-404). System 500 further includes an obstacle classification module 530 that is configured to classify (e.g., into one of a multiple of appropriate categories) an obstacle that is actually observed or otherwise sensed as vehicle 10 travels along the modified path. Module 530 then produces an output 504 including information regarding the observed and/or sensed obstacle, such as the obstacles position, the objects classification, and the like.

Modules 520 and 530 may be implemented in a variety of ways, including as machine learning models that have been trained via supervised or unsupervised learning. For example, modules 520 and 530 may be implemented as a convolutional neural network or other such model that can determine the position, speed, acceleration, heading, and other attributes of the leading vehicle 401-404. In general, it will be understood that various embodiments of the system 100 according to the present disclosure can include any number of sub-modules embedded within the controller 34. As can be appreciated, the sub-modules shown in FIG. 5 can be combined and/or further partitioned to similarly select driving modes (or mode, depending upon whether multiple sport driving are provided). Inputs to the system 100 may be received from the sensor system 28, received from other control modules (not shown) associated with the autonomous vehicle 10, received from the communication system 36, and/or determined/modeled by other sub-modules (not shown) within the controller 34 of FIG. 1.

Figure 6:
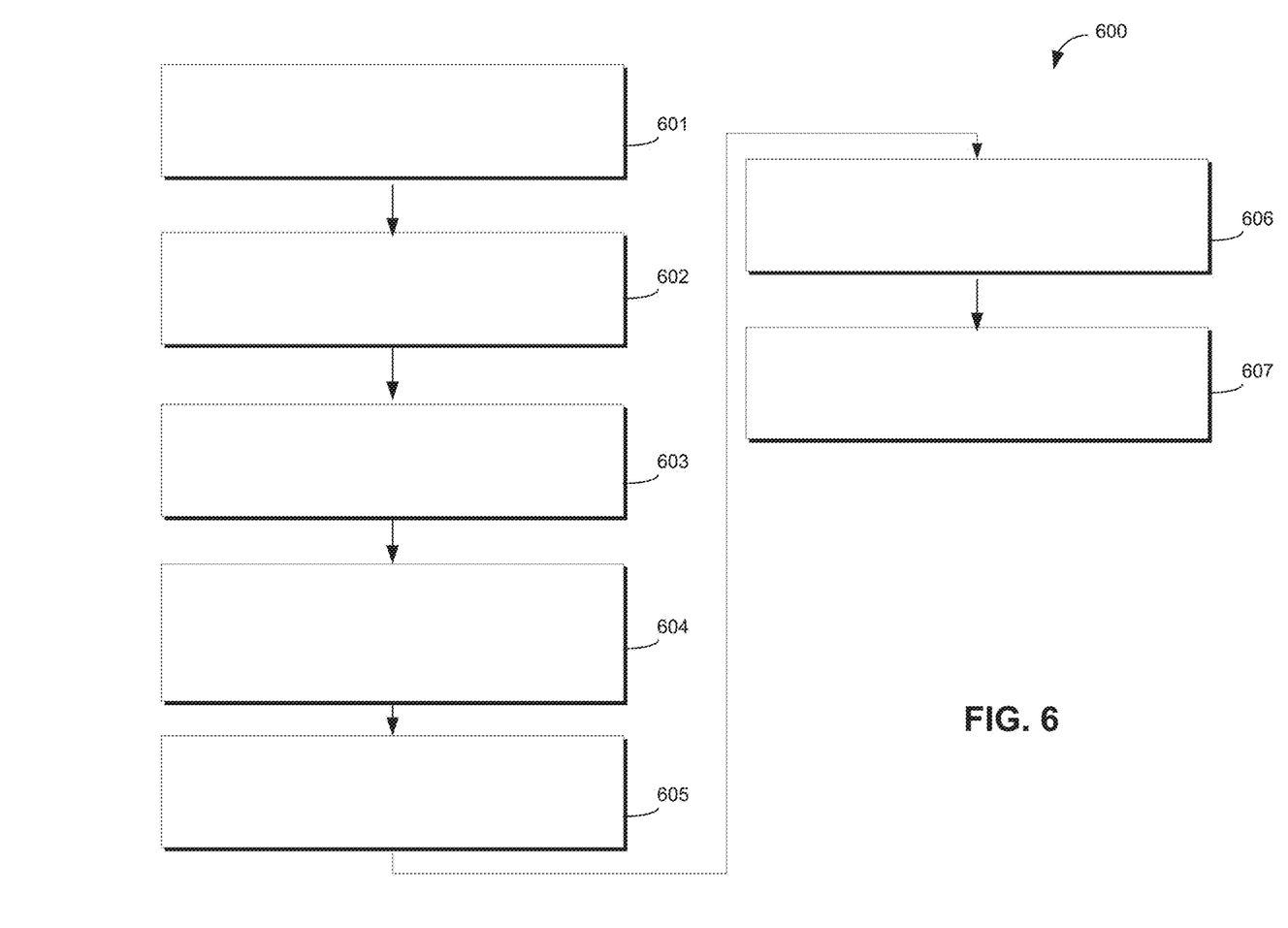
FIG. 6 is a flowchart illustrating a control method for controlling the autonomous vehicle, in accordance with various embodiments.

Referring now to FIG. 6, and with continued reference to FIGS. 1-5, the illustrated flowchart provides a control method 600 that can be performed by system 100 in accordance with the present disclosure. As can be appreciated in light of the disclosure, the order of operation within the method is not limited to the sequential execution as illustrated in FIG. 6, but may be performed in one or more varying orders as applicable and in accordance with the present disclosure. In various embodiments, the method 600 can be scheduled to run based on one or more predetermined events, and/or can run continuously during operation of the autonomous vehicle 10.

Initially, at 601, it is assumed that a path (e.g., a "first path") has been established for vehicle 400 through an appropriate path planning module (e.g., as described in connection with FIG. 3). This established path might correspond to the ideal, central path 453 shown in FIG. 4.

Next, at 602, vehicle 400 observes the behavior of one or more leading vehicles 401-404. That is, vehicle 400 is capable of tracking and storing (e.g., via the sensor system 28 working in conjunction with controller 34) the paths of one or more of vehicles 401-404. While FIG. 4 illustrates four vehicles 401-404 observable by vehicle 400, the range of embodiments is not so limited. Vehicle 400 may track the path of a single vehicle or the path of any number of vehicles to determine a revised path 452.

Note that, as illustrated in FIG. 4, the vehicle 400 may not be able to directly observe the presence of obstacle 472 along the ideal path, as it may be blocked by vehicles 401 and 402 and/or may not be visible until it is encountered directly by vehicle 400. Nevertheless, vehicle 400 may infer the presence of obstacle 472 by observing the behavior of vehicles 401-404. The act of following one or more lead vehicles in this way is sometimes referred to as "breadcrumbing." Such breadcrumbing may be employed for both transient objects (e.g., 471) and embedded obstacles (e.g., 472). In some embodiments (for example, in the case of potholes and other road irregularities) vehicle 400 may not be able to directly observe obstacle 472 via optical, lidar, or other sensors, and instead will infer the presence of such an obstacle through accelerometers and other sensor devices within sensor system 28.

Next, at 603, vehicle 400 (via module 520) determines a deviation from the first path 445 and then establishes, at 504, a modified path 452 based on the observed behavior. At this point vehicle 400 (and module 530) will be configured to anticipate that an obstacle may be encountered as it moves along modified path 452.

Accordingly, if an obstacle 471 or 472 is encountered, vehicle 400 observes and classifies that obstacle. A variety of classification schemes may be used. In one embodiment, for example, obstacles are classified by module 530 as being either "transient"" or "embedded." It will be understood that these categorize or classes are not intended to be exhaustive or limiting, but are merely used as rough categories that are helpful in developing path-planning heuristics. Any number of predefine classifications may be defined. As detailed below, this classification may be performed by systems on-board vehicle 10, such as sensor system 28 and controller 34.

As used herein, a "transient" obstacle is an obstacle that may or may not be in the direct path of the vehicle, but is nevertheless an obstacle that drivers tend to accommodate by altering their paths. Examples of transient obstacles include, without limitation, boxes, car parts, small animals (either animate or inanimate), tire debris, emergency vehicles, traffic cones, stopped cars on the shoulder, fallen tree branches, tumbleweeds, and the like. Such obstacles are "transient" in the sense that they are typically removed from a roadway (or otherwise rendered innocuous) in the short term and do not become the type of long term obstacle that a vehicle will encounter on a day-to-day basis. In FIG. 4, for example, obstacle 471 is illustrated as a cardboard box that could be classified as a transient obstacle.

In contrast, an "embedded" obstacle is an obstacle that may or may not be in the direct path of a vehicle, and is not an obstacle that strictly requires path alteration, but is nonetheless a feature or object that most drivers will attempt to avoid through path alteration. Examples of embedded obstacles include, without limitation, potholes, large swells, speed bumps, chatter bumps, particularly rough lanes, raised manhole covers, and the like. Such obstacles are "embedded" in the sense that, unlike transient obstacles, they tend to remain in place for an extended length of time—e.g., until proper maintenance to the roadway is performed. In FIG. 4, for example, obstacle 472 is illustrated as a pothole that might be considered an embedded obstacle.

In general, when vehicle 400 is sufficiently close to an obstacle 471, 472, it will be capable of imaging (through any combination of sensors) the obstacle and documenting the resulting sensor input characteristics (step 606). This information may then be used, for example, to further train obstacle classification module 530—that is, module 530 may increase its understanding of obstacle characteristics over time.

Using obstacle 471 as an example, obstacle information helpful for path planning may include, for example, an optical image of the obstacle (in this case, an image of a cardboard box), a lidar image of the obstacle (e.g., a point-cloud), GPS coordinates of the obstacle, a prediction as to the length of time the obstacle is likely to remain in roadway 420, and the like. The latter time prediction might be determined, for example, via a machine learning model, such as a convolutional neural network, configured to classify obstacle 471 and, given past data (which also may be stored in external system 52), estimate the average time that such objects tend to stay in the roadway.

As mentioned above, in the case of embedded obstacles such as obstacle 472, vehicle 400 may not be able to actually observe the obstacle visually or with lidar. This is particularly the case with bumps and shallow potholes, which may be more "felt" than seen. In such cases, the presence of the embedded obstacle may be confirmed via other sensor information available to vehicle 10, such as accelerometers and other IMU data that can sense a large "jerk" value (time derivative of acceleration) associated with the vehicle suspension encountering such an obstacle. Such sensor information can be used in conjunction with optical and lidar data to further train the model implemented by module 530.

Finally, at step 607, vehicle 400 subsequently provides information regarding the obstacle 471 and/or 472 to an external entity, such as system 52 of FIG. 2, which may store the obstacle information within database 53 as map data for future path planning by vehicle 400 and any other vehicle having access to system 52. That is, the presence of the observed obstacle(s) may subsequently affect path planning for a certain period of time. In accordance with one embodiment, module 530 might estimate the likely "half-life" of the obstacle based on its classification. For example, given past experience and training, vehicle might expect a pothole 472 to remain in place for weeks or even months, but will assume that a box 471 will be removed from roadway 420 within a few hours. Subsequent observations by vehicle 400 as well as other vehicles may be used to confirm or invalidate the presence of an obstacle 471, 472 in roadway 420 and modify the map data within database 53 accordingly. In some embodiments, the stored obstacle information includes a measure of the obstacle's severity based on a vehicle response metric (e.g., jerk measurement from an IMU, or the like), the location of the obstacle in the lane (right or left side), and whether the obstacle is avoidable without breaching lane boundaries. That is, if the obstacle is not avoidable AV 10 might choose to slow down or change driving style to minimize the effects on AV 10.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A path planning method for a vehicle, the method comprising:
    establishing a first path for a first vehicle;
    receiving, at the first vehicle, sensor data associated with a path of one or more leading vehicles observed in the vicinity of the first vehicle;
    establishing a modified path that diverges from the first path a and that follows a path of the one or more leading vehicles;
    detecting, at the first vehicle, an obstacle in a vicinity to the first path while the first vehicle is traveling along the modified path; and
    classifying, with a processor, the obstacle observed by the first vehicle along the modified path.

2. The method of claim 1, wherein the obstacle is classified as one of a transient obstacle and an embedded obstacle.

3. The method of claim 1, further including documenting a plurality of characteristics of the observed obstacle and transmitting the characteristics to a remote database via a network.

4. The method of claim 3, wherein the plurality of characteristics includes a severity measure associated with the observed obstacle.

5. The method of claim 3, wherein the plurality of characteristics includes an estimate of the likely duration of the observed obstacle's presence.

6. The method of claim 3, wherein the plurality of characteristics includes an indication of lane placement of the observed obstacle.

7. The method of claim 3, further including modifying a map database based on the plurality of characteristics stored in the remote database.

8. An autonomous vehicle comprising:
    one or more sensors configured to produce sensor data associated one or more leading vehicles located in the vicinity of the autonomous vehicle;
    a leading vehicle observation module configured to, by a processor, receive the sensor data and establish a modified path that diverges from an initially established path and that follows a path of the one or more leading vehicles;
    an obstacle classification module, including a processor, configured to detect an obstacle in a vicinity to the first path while the first vehicle is traveling along the modified path; and classify the obstacle observed by the autonomous vehicle along the modified path.

9. The autonomous vehicle of claim 8, wherein the obstacle classification module classifies the obstacle as one of a transient obstacle and an embedded obstacle.

10. The autonomous vehicle of claim 8, further including documenting a plurality of characteristics of the observed obstacle and transmitting the characteristics to a remote database via a network.

11. The autonomous vehicle of claim 10, wherein the plurality of characteristics includes a severity measure associated with the observed obstacle.

12. The autonomous vehicle of claim 10, wherein the plurality of characteristics includes an estimate of the likely duration of the observed obstacle's presence.

13. The autonomous vehicle of claim 10, wherein the plurality of characteristics includes an indication of lane placement of the observed obstacle.

14. The autonomous vehicle of claim 8, further including modifying a map database based on the plurality of characteristics stored in the remote database.

15. A system for controlling a vehicle, comprising:
    one or more sensors configured to produce sensor data associated one or more leading vehicles located in the vicinity of the autonomous vehicle;
    a leading vehicle observation module, including a processor, configured to receive the sensor data and establish a modified path that diverges from an initially established path and that follows a path of the one or more leading vehicles; and an obstacle classification module configured to detect an obstacle in a vicinity to the first path while the first vehicle is traveling along the modified path; and classify the obstacle observed by the autonomous vehicle along the modified path.

16. The system of claim 15, wherein the obstacle classification module classifies the obstacle as one of a transient obstacle and an embedded obstacle.

17. The system of claim 15, wherein the obstacle classification module is further configured to document a plurality of characteristics of the observed obstacle and transmit the characteristics to a remote database via a network.

18. The system of claim 17, wherein the plurality of characteristics includes a severity measure associated with the observed obstacle.

19. The system of claim 18, wherein the severity measure is determined via an inertial measurement unit provided within the vehicle.

20. The system of claim 17, wherein the plurality of characteristics includes an estimate of the likely duration of the observed obstacle's presence.

* * * * *